United States Patent
Warlick, Jr. et al.

(10) Patent No.: US 10,865,746 B2
(45) Date of Patent: Dec. 15, 2020

(54) OPPOSED-PISTON ENGINE IN A LIGHT-DUTY TRUCK

(71) Applicant: ACHATES POWER, INC., San Diego, CA (US)

(72) Inventors: Richard D. Warlick, Jr., Farmington Hills, MI (US); Cain Piotrowski, Farmington Hills, MI (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 16/414,082

(22) Filed: May 16, 2019

(65) Prior Publication Data

US 2020/0025161 A1   Jan. 23, 2020

Related U.S. Application Data

(60) Provisional application No. 62/677,318, filed on May 29, 2018, provisional application No. 62/693,217, filed on Jul. 2, 2018.

(51) Int. Cl.

| | |
|---|---|
| *F02M 35/10* | (2006.01) |
| *F02M 26/42* | (2016.01) |
| *F02M 26/41* | (2016.01) |
| *B60K 5/02* | (2006.01) |
| *B60K 17/04* | (2006.01) |

(Continued)

(52) U.S. Cl.
CPC .............. *F02M 26/42* (2016.02); *B60K 5/02* (2013.01); *F02M 26/41* (2016.02); *B60K 17/04* (2013.01); *B62D 21/02* (2013.01); *B62D 25/081* (2013.01); *B62D 25/082* (2013.01); *B62D 25/105* (2013.01); *B62D 33/02* (2013.01)

(58) Field of Classification Search
CPC ........ F02M 26/42; F02M 26/41; F02M 26/04; F02M 26/05; F02M 26/06; B60K 5/02; B60K 17/04; B60K 13/04; B62D 33/02; B62D 25/105; B62D 25/082; B62D 25/081; B62D 21/02; F02B 75/282; F01B 7/14; B60Y 2200/141
USPC ............... 123/53.3, 53.6, 55.5, 55.2, 568.17, 123/568.18, 184.28, 184.29, 195 AC, 41.7
See application file for complete search history.

(56) References Cited

U.S. PATENT DOCUMENTS

| | | | |
|---|---|---|---|
| 3,207,250 A | 9/1965 | Bamford | 180/68.4 |
| 3,791,482 A | 2/1974 | Sykora | 181/35 R |

(Continued)

FOREIGN PATENT DOCUMENTS

| | | | |
|---|---|---|---|
| EP | 2874161 A1 | 5/2015 | ............. H01F 27/24 |
| WO | WO-2015/192859 | 12/2015 | |

OTHER PUBLICATIONS

International Search Report and Written Opinion dated Jan. 13, 2020, for PCT application No. PCT/US2019/032618.

*Primary Examiner* — Hai H Huynh
(74) *Attorney, Agent, or Firm* — Terrance A. Meador; Julie J. Muyco

(57) ABSTRACT

An opposed-piston engine is configured to fit in an engine compartment of a light-duty truck without compromising engine operations or the integrity of the engine compartment. The opposed-piston engine includes an air handling system and can be configured so that a cylinder assembly of the engine is tilted. The tilt of the cylinder assembly can allow for all of the components of the engine's air handling system to be located on one side of the opposed-piston (Continued)

engine. The air handling system of the opposed-piston engine can be configured with a cobra-head shaped intake duct assembly.

29 Claims, 12 Drawing Sheets

(51) Int. Cl.
  *B62D 21/02* (2006.01)
  *B62D 25/08* (2006.01)
  *B62D 25/10* (2006.01)
  *B62D 33/02* (2006.01)

(56) References Cited

U.S. PATENT DOCUMENTS

| | | |
|---|---|---|
| 4,251,183 A | 2/1981 | Liu et al. .................. 415/198.1 |
| 4,549,762 A | 10/1985 | Burk et al. .................... 296/208 |
| 4,689,060 A | 8/1987 | Koske ........................ 55/385 B |
| 6,055,946 A | 5/2000 | Dombek et al. ............ 123/41.11 |
| 6,391,709 B1 | 5/2002 | Jost et al. ...................... 438/253 |
| 7,014,591 B2 | 3/2006 | Batten, Jr. et al. ............. 440/38 |
| 8,123,283 B2 | 2/2012 | Edwards et al. ........... 296/183.1 |
| 8,186,153 B2 | 5/2012 | Schindler et al. ............... 60/311 |
| 8,596,405 B2 | 12/2013 | Sunsdahl et al. ............. 180/312 |
| 8,870,271 B2 | 10/2014 | Ellison et al. ....... B62D 25/081 |
| 9,470,135 B2 | 10/2016 | Sturmon et al. .......... F01P 1/06 |
| 9,487,246 B2 | 11/2016 | Courtright et al. .... B62D 33/02 |
| 9,770,973 B1 | 9/2017 | Vaddiraju ............. B60K 11/08 |
| 9,849,770 B2 | 12/2017 | Fuqua ..................... B60K 5/02 |
| 10,106,207 B2 | 10/2018 | Fassezke et al. .... B62D 33/023 |
| 2007/0039572 A1 | 2/2007 | Lemke et al. |
| 2008/0017624 A1 | 1/2008 | Hazen .......................... 219/202 |
| 2014/0332306 A1 | 11/2014 | Fuqua |
| 2015/0337728 A1 | 11/2015 | Fuqua et al. |
| 2016/0032861 A1 | 2/2016 | Fuqua |
| 2017/0030256 A1 | 2/2017 | Sturmon et al. ......... F01P 11/10 |

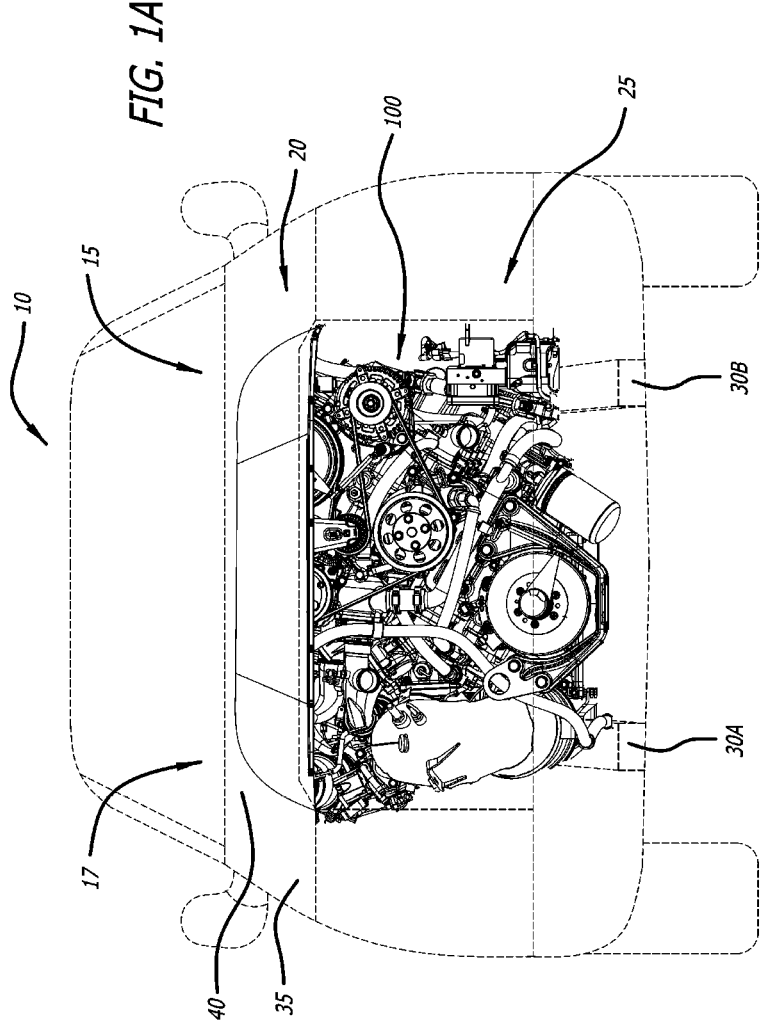

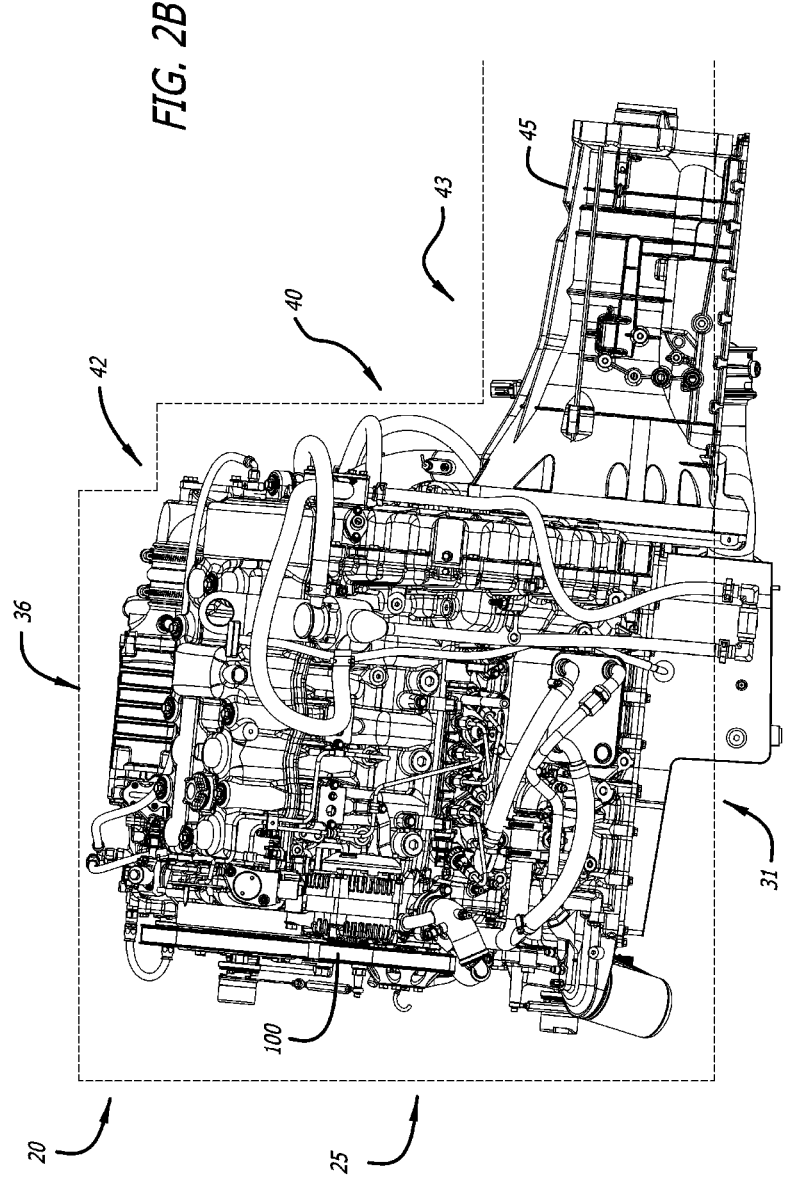

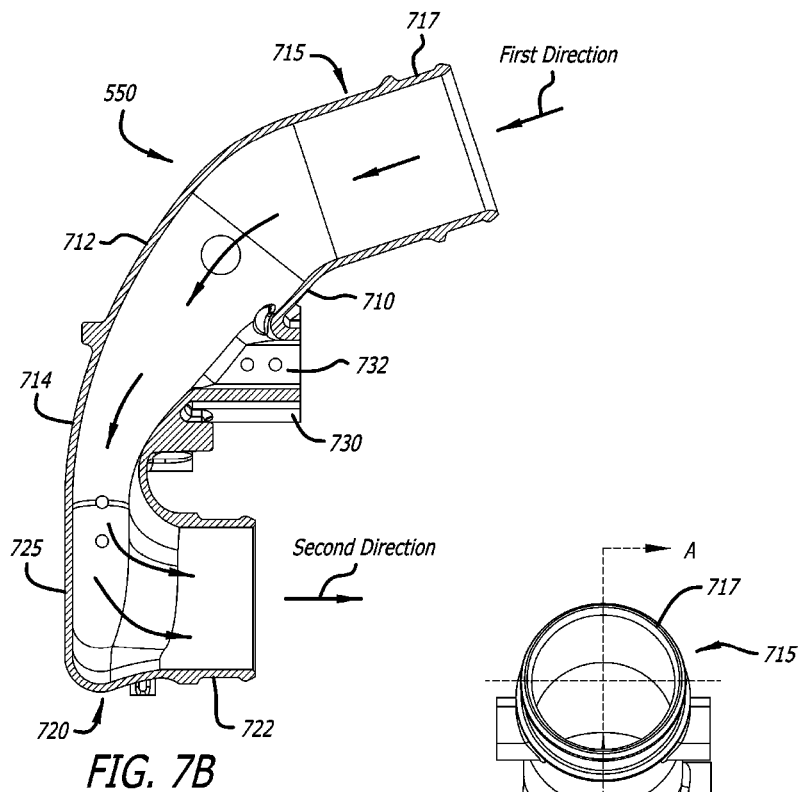
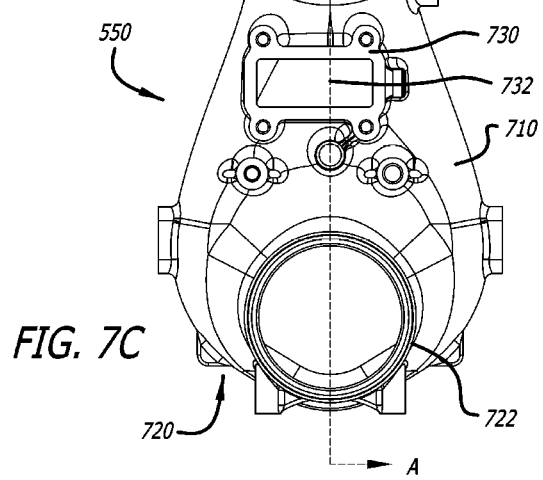

OPPOSED-PISTON ENGINE IN A LIGHT-DUTY TRUCK

RELATED APPLICATIONS

This application claims priority under 35 U.S.C. 119(e) to U.S. Provisional Application No. 62/677,318, titled "Opposed-Piston Engine In A Light-Duty Truck," filed May 29, 2018; and U.S. Provisional Application No. 62/693,217, titled "Opposed-Piston Engine In A Light-Duty Truck," filed Jul. 2, 2018.

STATEMENT REGARDING FEDERALLY SPONSORED RESEARCH

This invention was made with government support under Department of Energy Project Agreement No.: DE-AR0000657 awarded by the Advanced Research Projects Agency-Energy. The government has certain rights in the invention.

FIELD

The field relates to a vehicle equipped with a two-stroke cycle, opposed-piston engine. Specifically the field includes fitment of a compression-ignition, multi-cylinder opposed-piston engine in a vehicle structure, particularly that of a light-duty truck.

BACKGROUND

A two-stroke cycle engine is an internal combustion engine that completes a power cycle with a single complete rotation of a crankshaft and two strokes of a piston connected to the crankshaft. One example of a two-stroke cycle engine is an opposed-piston engine in which a pair of pistons is disposed in opposition in the bore of a cylinder for reciprocal sliding motion therein. Each cylinder has exhaust and intake ports. Each port is constituted of one or more arrays or sequences of openings disposed circumferentially in the cylinder wall near a respective end of the cylinder. The reciprocal movements of the pistons across the ports cause the ports to open and close.

Opposed-piston engines possess numerous desirable features with respect to other two-stroke engines. Such advantages include low combustion chamber surface to volume ratio, superior scavenging, good engine balance in multiple cylinder designs, and superior power/weight ratios. These and other advantages have motivated development of vehicle designs that fit opposed-piston engines into light-duty trucks.

A truck is a vehicle equipped with an engine, which is designed for carrying and/or pulling loads. The term light-duty truck can be applied to motor vehicles with the engine compartment forward of the passenger compartment and cargo bed that are used to convey persons and optionally goods. In the United States of America, the term light-duty truck can be applied to vehicles having a gross vehicle weight rating of no more than 8,500 pounds (3,855.5 kg) that fulfills at least one of the following criteria: the vehicle is designed primarily for the purpose of transportation of property or is a derivation of such a vehicle; the vehicle is designed primarily for the transportation of persons and has a capacity for more than twelve persons; and the vehicle is available with special features enabling off-street or off-highway operation and use. Outside the U.S.A., the term "light-duty" can be applied passenger cars and vans, as well as to smaller trucks. Such smaller trucks include those with a gross mass not exceeding 3500 kg (e.g., in Australia, Canada) or vehicles in class M1, M2, N1, and N2 in Europe. Typical light-duty truck configurations include vans, sport utility vehicles, and pickup trucks.

Historically, light-duty trucks were used principally for the transportation of goods or persons in activities associated with one's work. Because of this historical usage, fuel economy standards for light-duty trucks were not as stringent as those for cars which are used predominantly for personal transportation. Increasingly, light-duty trucks are used for personal transportation, akin to passenger vehicles, and so there is a trend towards holding the class of vehicles encompassed by light-duty trucks to higher fuel economy standards. It is therefore desirable to enable a vehicle such as a light-duty truck to be fitted with an efficient, opposed-piston engine while retaining structural characteristics common to such vehicles.

A conventional light-duty truck configuration includes an engine compartment located forward of a passenger compartment in a longitudinal direction of the truck. The engine compartment has evolved to house four-stroke engines with vee- and inline constructions. These constructions accommodate a cylinder profile having an axial dimension (length) sufficient to guide a single piston between top and bottom dead center locations. An opposed-piston engine construction accommodates a cylinder profile having a length sufficient to guide two pistons, that are mutually-opposed, respectively moving in opposing directions between top and bottom center locations. A cylinder of an opposed-piston engine is much longer than a cylinder of a four-stroke engine for which the engine compartment of a light-duty truck is designed. In addition, the opposed-piston engine may be outfitted with two crankshafts, one at an intake side of a row of cylinders, the other at an exhaust side, which further extends the length which the cylinders impose. Consequently, the opposed-piston engine cannot be simply "dropped" into the engine compartment space of a conventional light duty truck. However, it may be possible to mount the opposed-piston engine in such a manner as to fit into the engine compartment space. One measure of engine-to-space accommodation is to mount the opposed-piston engine with the cylinder axis tilted to one side or the other of the engine compartment. In this regard, see U.S. Pat. No. 9,849,770, which teaches placement of an opposed-piston engine in a heavy-duty truck. However, tilting alone may not fully accommodate the engine to the engine compartment of a light-duty truck, and further measures may be required.

Another feature of an opposed-piston engine that poses a challenge to fitment is configuration of engine auxiliary systems. In this regard, the air handling system of a vee-configured four-stroke engine includes components positioned near cylinder heads that close ends of the cylinders. In some modern vee-configured engines, air intake and transport components are distributed along a centerline of the engine, in wedge-shaped space between the cylinder banks, while exhaust collection and processing components are arrayed along the sides of the engine, outside of the cylinder banks. Some designs reverse this arrangement, but in either case, light-duty truck engine compartments configured for four-stroke engines can exhibit relatively low profiles in a vehicle height direction between the hood and front axle.

However, there is no space between cylinder banks in an opposed-piston engine. Instead, auxiliary systems must be positioned adjacent a tilted slab presented by an opposed-piston engine block containing the in-line cylinders. For example, the air handling system of an opposed-piston engine has components located adjacent the intake ports and exhaust ports near respective ends of a cylinder. In this case, a turbocharger may be located in close proximity to an exhaust plenum that collects exhaust from the cylinder exhaust ports, and a supercharger may be located near an intake plenum that distributes charge air to the intake ports. Intake and exhaust ducting for the air handling components is arranged along one side of the tilted engine block, extending between the intake and exhaust plenums. Depending on placement of the tilted engine, one or more portions of the ducting may be placed in close, nearly abutting proximity to at least one boundary of the engine compartment of a light duty truck.

Accordingly, the problem of fitting a two-stroke, opposed-piston engine in the engine compartment of a light-duty truck may not be entirely solved solely by tilting the engine. Even when the engine is disposed in a tilted or slanted orientation it may still be prevented from fitting into the engine compartment by air handling elements that are close to boundaries of the engine compartment.

SUMMARY

An object of the invention is to provide a light-duty truck having an opposed-piston engine fitted into the engine compartment of the truck. The opposed-piston engine can be operated with greater efficiency and with lower pollutant emissions than a conventional four-stroke engine.

A particular object of the invention is to provide a light-duty truck with a two-stroke, combustion ignition, opposed-piston engine in an engine compartment that may have been designed to accommodate a conventional four-stroke engine. Another object of the invention is to provide an opposed-piston engine configured to fit in an engine compartment of a light-duty truck without compromising engine operations or the integrity of the engine compartment.

In order to fit an opposed-piston engine to the engine compartment of a light duty truck, the engine is configured with an in-line row of cylinders disposed in a tilted or slanted orientation with respect to an engine height direction or a vehicle height direction. At least one duct of an air handling system of the engine is configured to present a flattened profile in a duct portion that approaches the firewall of the engine compartment. The flattened profile provides flow path space for air flow with transport capacity that is sufficient to serve charge air provisioning requirements of the engine in all stable and transit modes of engine operation, without compromising the integrity of the engine compartment.

In some aspects, the duct portion may also provide an entry point for exhaust gas recirculation (EGR).

BRIEF DESCRIPTION OF THE DRAWINGS

FIG. 1A is a perspective view of the front end of a light duty truck showing an opposed-piston engine placed in an engine compartment.

FIG. 2B is a partial schematic drawing showing a side elevation view of the engine of FIG. 2A in relation to a defined engine compartment of a light duty truck.

FIG. 7B is a side sectional view of the turning bend duct of FIG. 7A. FIG. 7C is a front elevation view of the turning bend duct of FIG. 7A.

DETAILED DESCRIPTION

This description is directed to placement of an opposed-piston engine (also called "the engine") in a light-duty truck (also called "the vehicle"), wherein the engine includes a cylinder assembly and an air handling system. The engine is supported on frame rails of the vehicle's chassis and comprises one or more cylinders configured in an inline array extending in a length dimension of the vehicle. The inline array is tilted (or slanted, or inclined) in that a plane containing the longitudinal axes of the cylinders is offset from a height dimension of the vehicle, so as to accommodate the engine within the engine compartment of the vehicle. The engine may be configured such that the cylinder assembly slants upwardly to one side (e.g., the driver's side or the passenger's side) of the vehicle while components of the air handling system are predominantly on the other side of the vehicle. Implementations of a light-duty truck equipped with a two-stroke, compression-ignition, opposed-piston engine are provided below.

Figure 1B:
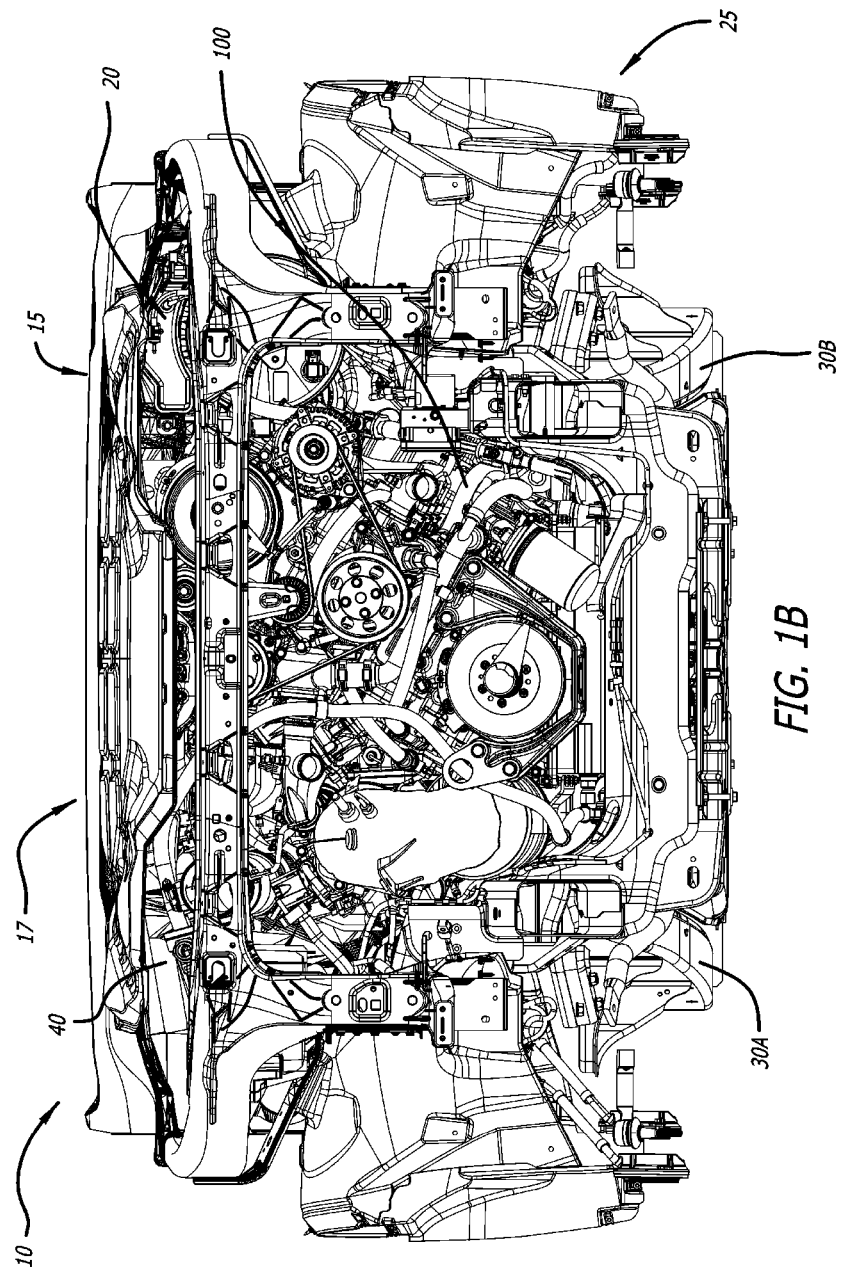
FIG. 1B is a front elevation views of the opposed-piston engine placed in the engine compartment of FIG. 1A.

FIGS. 1A and 1B show a light-duty truck 10 with an opposed-piston engine 100 in its engine compartment 20. The vehicle 10 has a driver's side 15, a passenger's side 17, a chassis with frame rails 30A, 30B, a hood 35, and a firewall 40. The engine compartment 20 surrounds and contains the engine 100 and is bounded by the hood 35, a cowl panel, the firewall 40, the chassis, side walls, and a front grill of the vehicle. The driver's side 15 is the left-hand side of the truck 10 shown in FIGS. 1A and 1B, when sitting in the vehicle, and the passenger's side 17 is the right-hand side of the truck shown in FIGS. 1A and 1B. Of course in vehicle applications for certain venues (Great Britain, Japan, etc.), the driver and passenger sides may be reversed without limiting the principles set forth in this specification.

Figure 2A:
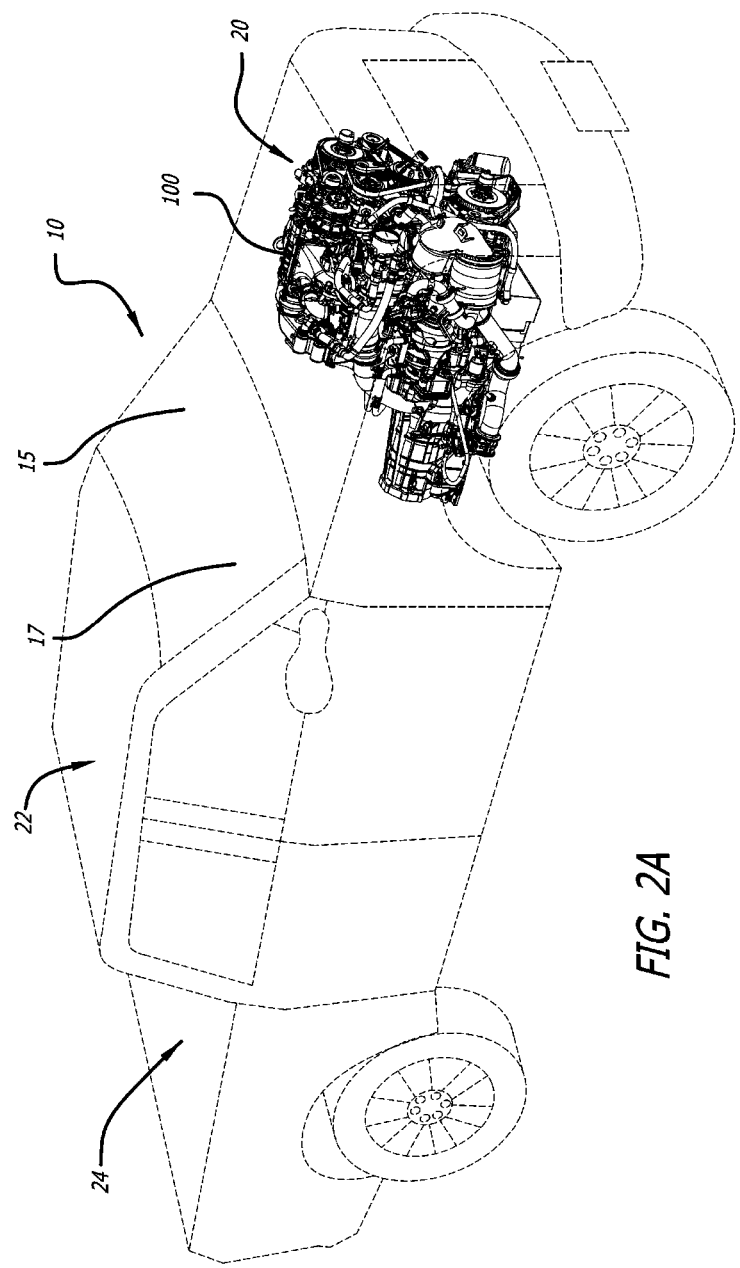
FIG. 2A is an isometric view of the opposed-piston engine of FIGS. 1A and 1B placed in an engine compartment of a light-duty truck.

FIG. 2A shows the vehicle 10 with the engine 100 contained in the engine compartment 20 in an oblique view toward the driver's side 15. The engine 100 is secured to the chassis frame rails by one or more brackets (not shown). The engine compartment 20 is located forward of the passenger compartment 22 and cargo bed 24 (also called a "cargo bay", or "load-carrying bed"). FIG. 2B shows an elevation view of the engine 100 connected to a transmission 45 with the boundaries of the engine compartment 20 shown schematically, as if viewed from the driver's side of the vehicle. The boundaries of the engine compartment 20 include a hood line 36, the front 25 of the vehicle, the chassis 31, a rain tray cowl 42, and the firewall 40. There can be a clearance between the engine 100 and boundaries of the engine compartment 20. The clearance is in the range of about 15 mm to about 50 mm. The firewall 40 separates the passenger compartment from the engine compartment 20, and the passenger floor 43 of the vehicle lies above the transmission 45. In the light-duty trucks described herein, the passenger compartment 22 lies behind the engine compartment 20, above the transmission 45, and forward of the truck's cargo bed 24.

The opposed-piston engine described herein that is fitted into a light-duty truck includes an engine block with a cylinder assembly, and an air-handling system, that fit within the engine compartment of the truck. The engine connects to a transmission (i.e., gearbox) that is located rearwardly of the engine compartment. The engine is a two-stroke, uniflow scavenged opposed-piston engine that includes one or more cylinders with an intake port on one end of each cylinder and an exhaust port, longitudinally separated from the intake port, on the other end of each cylinder. In each cylinder, a pair of pistons slide inwardly towards a central portion of the cylinder where the pistons' crowns are closest to each other and form a combustion chamber with the cylinder bore. In response to combustion, pistons slide apart from top center (TC) locations towards bottom center (BC) locations in the cylinder. In the central portion of each cylinder, there are at least two openings for fuel injectors. Also in the central portion of each cylinder, near the openings for fuel injectors, there may be an opening for a pressure transducer, an orifice for a compression release valve, or both.

Figure 3A:
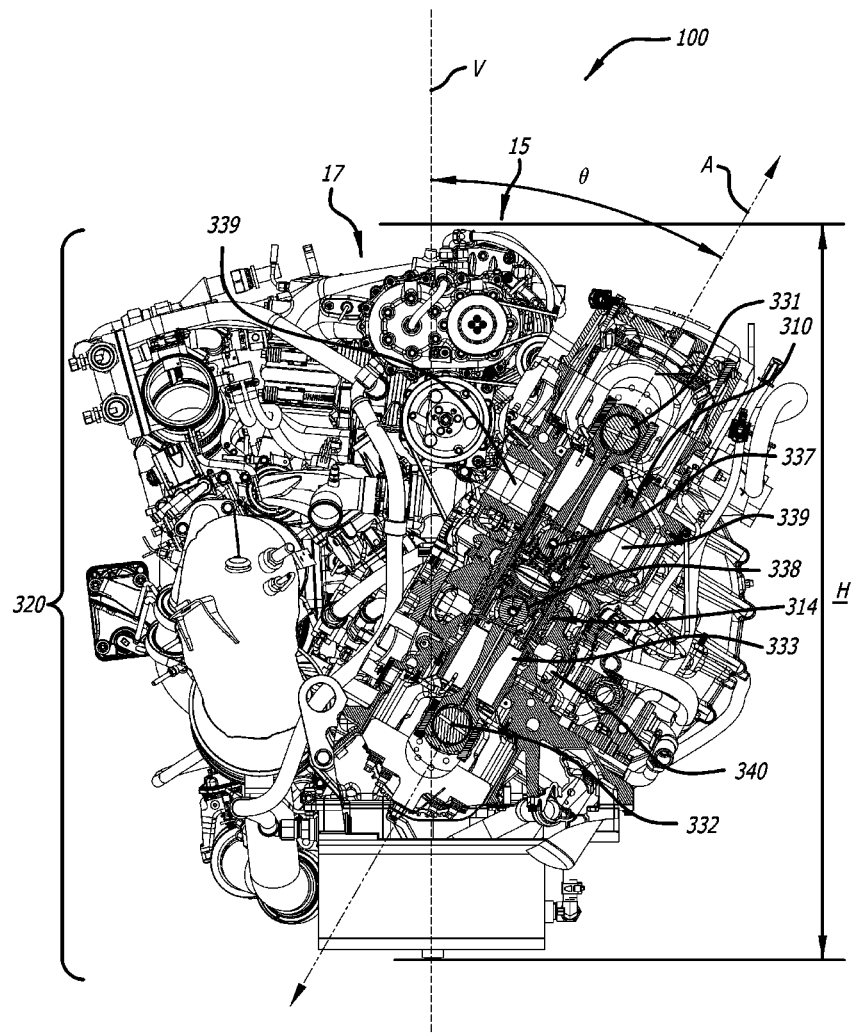
FIGS. 3A and 3B are cut-away views of the opposed-piston engine of FIGS. 1A and 1B.

The view shown in FIG. 3A is a cut-away view through the front-most cylinder 333 of the engine 100. Preferably, the engine 100 comprises an in-line, multi-cylinder opposed-piston engine. The engine includes an engine block 310 and an air handling system 320. The view of the engine 100 is taken from the front of the engine, where the front of the vehicle and FEAD (front end accessory drive, 313 in FIG. 3B and 513 in FIG. 5) would be, looking toward the back of the engine. The engine block includes a cylinder assembly 314. The cylinder assembly 314 includes three cylinders 333 disposed in an in-line configuration that is slanted with respect to a vertical height dimension of the engine. Pistons are slidably disposed inside the cylinders, and fuel injectors are provided for each cylinder. In each cylinder in the engine there is a pair of pistons, an intake piston 337 and an exhaust piston 338, which are attached via connecting rods to respective crankshafts 331 and 332. The intake piston 337 in each cylinder 333 moves across an intake port and the exhaust piston 338 in each cylinder 333 moves across an exhaust port. Each intake piston 337 attaches to a first crankshaft 331 and each exhaust piston 338 attaches to a second crankshaft 332. Each port (e.g., intake port, exhaust port) may include an array of port openings arranged around a respective circumference of each cylinder that allow for air and exhaust communication between the cylinder bore and respectively an intake plenum 339 and exhaust plenum 340. In the cylinder assembly 314 seen in FIG. 3A, the cylinder assembly portion that includes the intake ports of the cylinders 333 is at one end of the assembly; this is the "intake end" of the cylinder assembly 314. Correspondingly, the portion of the cylinder assembly 314 where the exhaust ports of the cylinders is located, near the second end of the assembly, is the "exhaust end" of the cylinder assembly 314. In other words, the first crankshaft 331 (also called the "intake crankshaft") is at the intake end of the cylinder assembly and the second crankshaft 332 (the "exhaust crankshaft") is at the exhaust end of the cylinder assembly.

In FIG. 3A, a longitudinal axis A of one cylinder 333 of the assembly 314 is shown, along with a vertical plane V of the engine. The axis A lies in a plane (C in FIG. 3B) with the axes of the other two cylinders (not seen), and so represents the plane. The vertical plane V is a plane that extends from the front of the engine, where the FEAD is located, to the back of the engine which is adjacent to a firewall when the engine is fitted into an engine compartment. Additionally, the vertical plane V can be thought of as a bisecting plane, such that it would be located approximately at the center of engine when measuring its fullest width and dividing the engine into a right side and a left side. The engine's over-all height H is measured in the direction of a unit vector in the vertical plane V. The angle $\theta$ between the engine's vertical plane V and the plane represented by the axis A represents a degree of tilt of the cylinder assembly. When the engine 100 is installed in the engine compartment 20 of the light duty truck 10, a height dimension of the truck may also be measured in the direction of a unit vector in the vertical plane V. Further, the vertical plane V may also bisect the truck into a driver's side and a passenger side.

With respect to other boundary components of an engine compartment in a light duty truck (shown in FIG. 2B), the tilted, in-line, multi-cylinder opposed-piston engine 100 may fit entirely in engine compartment space allotted to conventional four-stroke reciprocating internal combustion engines of the V-six, V-eight, or in-line multi-cylinder variety. That is to say, the engine 100 may fit entirely forward of a firewall that is between the engine compartment and the passenger compartment of the vehicle, under an unmodified hood and at least one cowl panel, behind the vehicle's front grille, and at least partially above the truck's chassis. As described above, the truck's chassis includes two frame rails (30A and 30B in FIGS. 1A and 1B) that span the length of the vehicle, from the front end, where the engine lies, to the rear of the vehicle. These spaced-apart frame rails are substantially parallel and have cross-members connecting one frame rail to the other at different intervals, so that the chassis resembles a ladder when viewed in plan from above the chassis. At least one sway bar can be attached to the chassis, and a sway bar can be situated under the engine within the engine compartment.

In the engine compartment, most of the opposed-piston engine sits above the chassis, between the spaced-apart frame rails, with the cylinders in an in-line configuration. However, the in-line cylinders of the opposed-piston engine shown in FIG. 3A are not oriented such that the longitudinal axis A is perpendicular to a plane containing the vehicle chassis. Instead, the cylinder assembly's longitudinal axis A is tilted at an angle of $\theta$ degrees with respect to the vertical plane V. As shown in FIG. 3A, a result of this inclination or slant in the cylinders is that the first crankshaft 331 is on a first side (e.g., vehicle's left-hand, or driver's side) while the second crankshaft 332 is nearer a center of the engine. Stated in other words, the cylinder assembly 314 is tilted to locate the intake end near the driver's side of the truck, in the vicinity of the hood, and to locate the exhaust end between the driver's side of the truck and the passenger's side of the truck.

As the figures show, the opposed-piston engine described herein has its engine block 310 and cylinder assembly 314 predominantly on one side of the truck and components of an air-handling system 320 on the other side. In the example shown in FIG. 3A, the engine block 310 is on the driver's side (e.g., vehicle's left-hand side) and the air handling system 320 is on the passenger's side (e.g., vehicle's right-hand side).

Figure 3B:
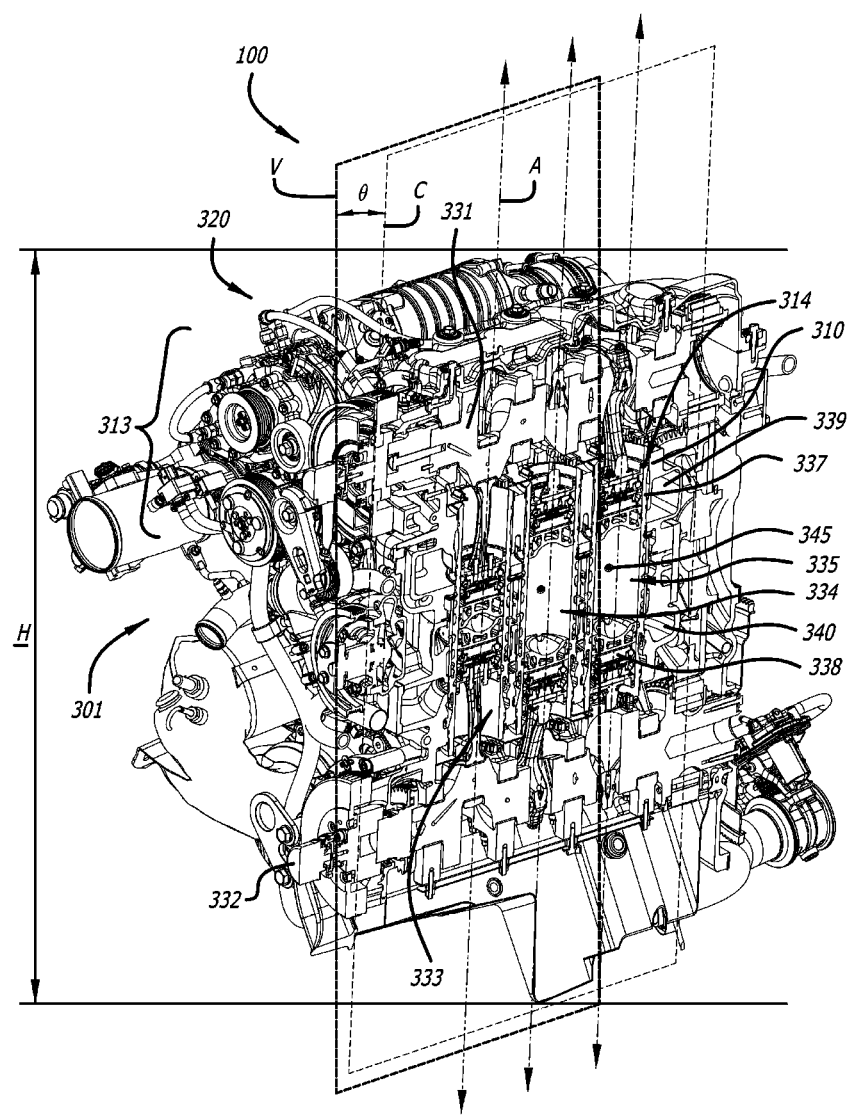

FIG. 3B is a cut-away view of the opposed-piston engine 100 shown in FIG. 3A that shows three cylinders 333, 334, 335 in the engine block 310. As in FIG. 3A, the air-handling system 320 is on the passenger's side of the engine and the engine block 310 is on the driver's side (i.e., left-hand side of the vehicle). The vertical plane V and a height H of the engine are shown in FIG. 3B, as well as the longitudinal axis A and the plane C in which the longitudinal axes of all three cylinders lie, including longitudinal axis A. The angle θ is shown between the planes V and C. The angle of offset θ between the plane C of the longitudinal axis of the cylinder assembly and the vertical plane V can range from 5° and 45°. The air-handling system 320 is predominantly on one side of the truck's engine bay (i.e. the truck's engine bay) and adjacent to the FEAD 313 in the engine. The FEAD 313 is located in the front portion 301 of the engine. As per FIGS. 3A and 3B, the engine includes the engine block 310 and a first crankshaft 331 that connects to the intake piston 337 in each cylinder and a second crankshaft 332 that connects to the exhaust piston 338 in each cylinder. The engine block 310 includes the cylinder assembly 314, as well as an intake plenum 339 and an exhaust plenum 340. The three cylinders 333, 334, 335 are included in the cylinder assembly 314. The intake plenum 339 surrounds the intake ports of each cylinder, allowing for air from the air-handling system to pass into each cylinder during scavenging. Correspondingly, the exhaust plenum 340 surrounds the exhaust ports of each cylinder and receives exhaust from each cylinder following a combustion event, during scavenging. The engine block 310 has a single fitting (e.g., connector, connecting flange) between the intake plenum 339 and the air handling system 320, as well as a single fitting between the exhaust plenum 340 and the air handling system 320. These fittings between the intake and exhaust plenums 339 and 340, can be located on one wall of the engine block 310, thus accommodating the slant of the cylinder assembly 314 and location of the air handling system 320 predominantly on one side of the engine. In each cylinder 333, 334, 335 there are a pair of openings for fuel injection nozzles (e.g., injection ports). FIG. 3B shows one injection port 345 of the pair that is present in each cylinder. Near the openings for fuel injectors, there can openings that may be used for a pressure transducer or as an orifice for compression release braking. The two-stroke, opposed-piston engine is a compression ignition engine that does not use spark plugs. In the opposed-piston engine, there is no spark plug or other source of electrified ignition; in the opposed-piston engine, combustion is solely based upon compression of intake air and/or exhaust gas mixture and the injection of fuel into the compressed air.

Figure 4:
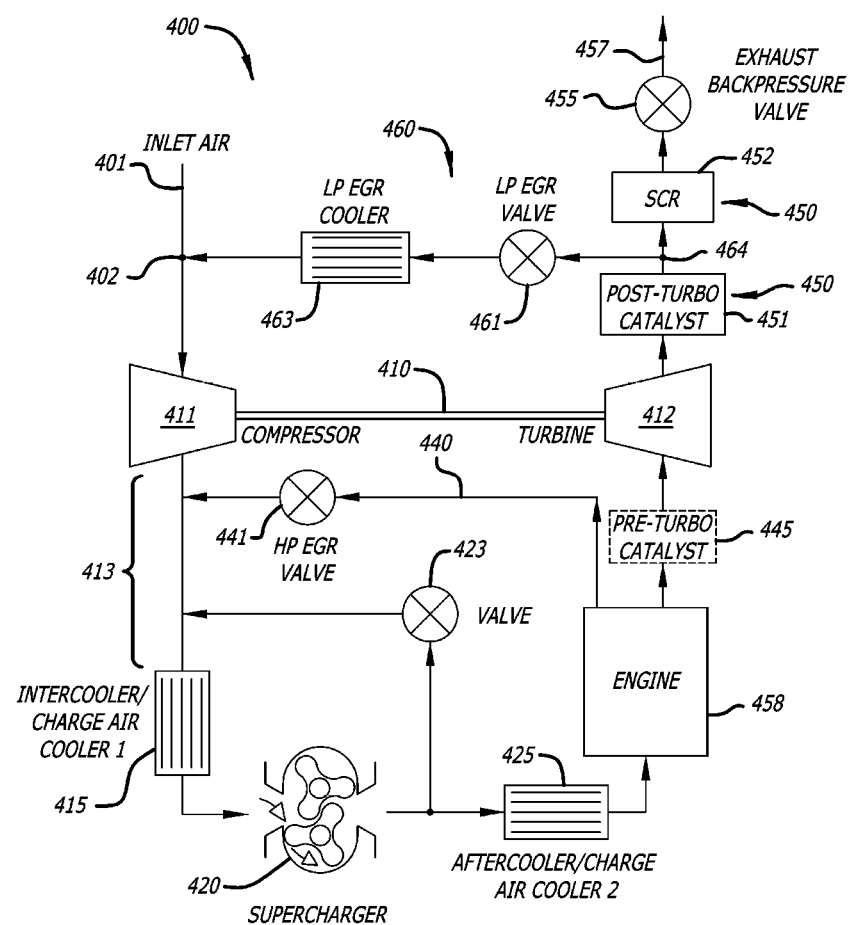
FIG. 4 is a schematic for an air handling system for an opposed-piston engine, such as the one shown in FIGS. 3A and 3B.

A typical air handling system for an opposed-piston engine is shown in FIG. 4. The air handling system 400 may comprise a turbocharger 410 in which a compressor 411 and a turbine 412 rotate on a common shaft. The turbocharger 410 extracts energy from exhaust gas collected by an exhaust plenum from the exhaust ports of the engine. In this regard, the turbine 412 is rotated by exhaust gas passing through it. This rotates the compressor 411, causing it to compress fresh air or a mixture of fresh air and recirculated exhaust gas. Compressed air output by the compressor 411 flows through an air channel 413 to an intercooler 415. From the intercooler 415, cooled, compressed air is provided to a supercharger 420. The supercharger 420 may be electrically driven by a motor or mechanically driven by a drive unit coupled to a crankshaft of the engine. The supercharger 420 further compresses the air, which is provided to the intake ports of the engine. The compressed air or air mixture output by the supercharger 420 (referred to as "charge air") can be transported through an aftercooler 425 to an intake plenum for provision to the intake ports of the engine. In some instances, exhaust products may be recirculated into the air channel 413 through one or both of a high pressure exhaust gas recirculation (HP EGR) loop 440 and a low pressure (LP) EGR loop 460.

The schematic representation of FIG. 4 illustrates a preferred air handling system embodiment for an opposed-piston engine placement within a light-duty truck. This preferred embodiment includes an air inlet conduit 401, the turbocharger 410, the intercooler 415, the supercharger 420, a supercharger bypass valve 423 (sometimes referred to as supercharger recirculation valve or a supercharger shunt valve), an aftercooler 425, a high-pressure EGR valve 441 in the HP EGR loop 440, a pre-turbocharger catalyst 445, an after treatment system 450 with a post-turbo catalyst 451 and a selective catalytic reduction device (SCR device, also known as a selective catalytic reduction on filter system) 452, an exhaust backpressure valve 455, a low-pressure EGR valve 461 in the LP EGR loop 460, a LP EGR cooler 463 in the LP EGR loop 460, and an exhaust outlet conduit 457. The engine is indicated by reference numeral 458.

Fresh air enters the air handling system 400 through the air inlet conduit 401 where it may be mixed with exhaust gas exiting the LP EGR loop 460 at a node 402 where the conduit 401 and the LP EGR loop 460 intersect. That intake air, or air and exhaust mixture, is compressed by the compressor 411 of the turbocharger 410 and provided thereby to an air channel 413. The compressed air (or compressed air and exhaust mixture) can then be mixed with exhaust exiting the HP EGR loop 440. The compressed air and any exhaust mixed in with it, is then cooled in the intercooler 415 before being further compressed by the supercharger 420. The amount of charge air produced by the supercharger 420 can be adjusted or modulated by action of the bypass valve 423 to a degree which matches boost needs of the engine. The charge air produced by the supercharger 420 passes through the aftercooler 425 before entering an intake plenum (e.g., 339 in FIGS. 3A and 3B) in the engine 458. The compressed air is further compressed by the opposed pistons in the cylinders in the engine 458. After a combustion event and power stroke, exhaust leaves the engine 458 through an exhaust plenum (e.g., 340 in FIGS. 3A and 3B).

The HP EGR valve 441 controls an amount of exhaust gas that recirculates to the air channel 413 through the HP EGR loop 440. Exhaust gas exiting the exhaust plenum may flow through an (optional) pre-turbocharger catalyst 445 to an inlet of the turbine 412. Downstream of the turbine 412, exhaust gas passes through the aftertreatment system 450, which includes the post-turbo catalyst 451 and selective catalytic reduction (SCR) device 452 component. The aftertreatment system 450 can have a single housing or encasement for the post-turbo catalyst 451 and SCR 452 component; in this configuration a conduit 464 connects the outlet of the aftertreatment system 450 to the LP EGR loop 460. The LP EGR loop 460 includes an LP EGR valve 461 that regulates the flow of exhaust gas passing from the LP EGR loop 460 into the conduit 401. Once exhaust gas passes through the LP EGR valve 461, it is transported through the LP EGR cooler 463, and the cooled exhaust gas is routed to the inlet air conduit 401 through the node 402 upstream of the compressor 411. Exhaust gas exits the air handling system 400 through the exhaust outlet conduit 457. The exhaust backpressure valve 455 can help to regulate the amount of exhaust gas that passes through the high-pressure and low-pressure 460 EGR loops 440 and 460, as well as any exhaust gas retained in the engine. In operation, the opposed-piston engine may utilize only the HP EGR loop 440 or both the HP EGR loop 440 and the LP EGR loop 460.

Figure 5:
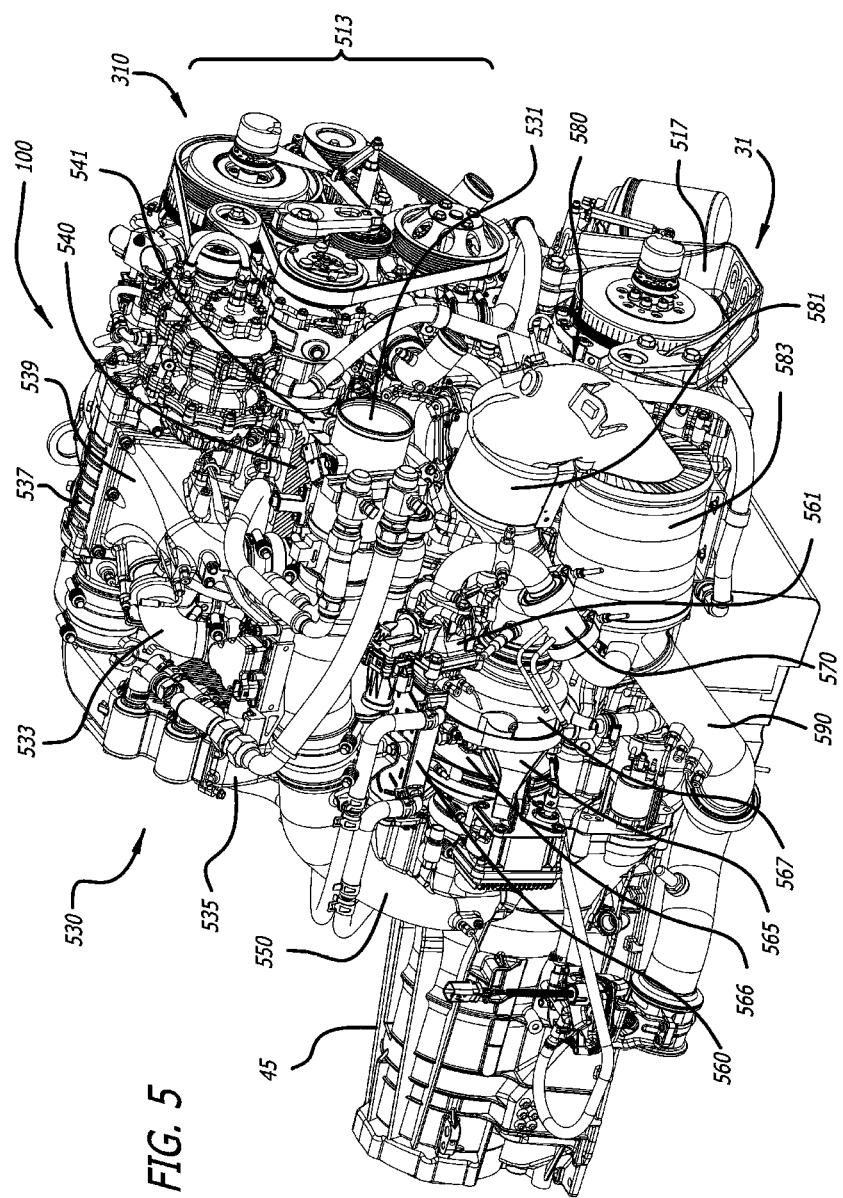
FIG. 5 shows the opposed-piston engine with an air handling system arranged for placement of the engine in an engine compartment of a light-duty truck.

FIG. 5 shows the opposed-piston engine 100 coupled to the drive train of the of the light-duty truck 10 through the transmission 45 as per FIG. 2. The transmission 45 can attach to the engine through the exhaust end crankshaft (332 in FIGS. 3A and 3B) located near the bottom of the engine.

The opposed-piston engine 100 includes the tilted engine block 310 on the driver's side of the engine, a front end accessory drive (FEAD) 513 at the front portion of the engine, and an air-handling system 530 according to the schematic of FIG. 4 on the passenger's side of the engine. The engine is secured to the vehicle chassis 31 by at least attachment bracket 517 and additionally may be secured using one or more side mount. The engine 100, together with the air handling system 530, and the FEAD 513, are configured to fit within a light-duty truck's engine compartment.

Figure 6A:
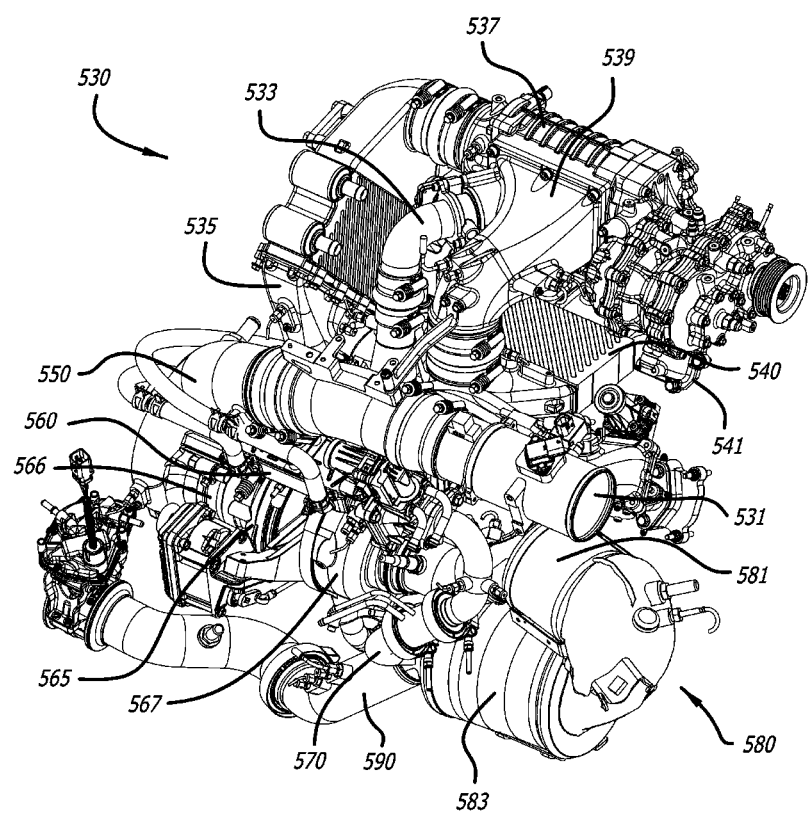
FIGS. 6A and 6B show respective right-hand side and left-hand side views of the air handling system arrangement of FIG. 5.
Figure 6B:
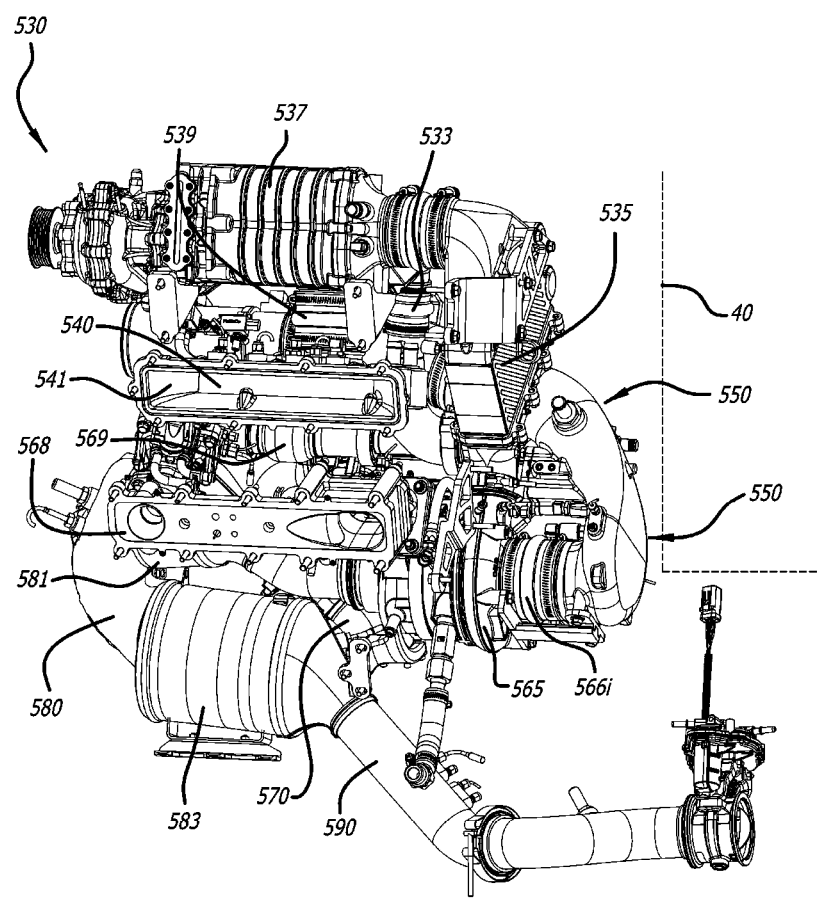

As shown in FIG. 5, and in greater detail in FIGS. 6A and 6B, the air-handling system 530 has an intake air conduit 531, a supercharger recirculation loop conduit 533, an intercooler 535, a supercharger 537, a supercharger output plenum 539, an aftercooler 540, a fitting 541 to an air intake plenum, a compressor intake conduit 550, an LP EGR cooler 560, an LP EGR valve 561, a turbocharger 565 with a compressor 566 and a turbine 567, an exhaust plenum conduit 568 (e.g., exhaust plenum fitting), an HP EGR loop conduit 569, an LP EGR loop conduit 570, an aftertreatment assembly 580, and an exhaust outlet conduit 590. The aftertreatment assembly 580 includes a diesel oxidation catalyst (DOC) 581 and a selective catalytic reduction on filter component (SCR device or component) 583. The selective catalytic reduction component 583 or device can be any suitable device with a substrate with a catalyst coating that provides both particle filtration and selective catalytic reduction functionality as exhaust gas flows across the substrate.

The components of the opposed-piston engine 100, including the air-handling system 530, are oriented within boundary components of an engine compartment in a light duty vehicle. To accomplish this, the orientation of components, such as the cylinder assembly 314, supercharger 537, intercooler 535, aftercooler 540, high-pressure EGR loop conduit 569, low-pressure EGR loop conduit 570, aftertreatment assembly 580, the air intake plenum 541, the exhaust plenum conduit, and the exhaust outlet conduit 590, can be varied, bent, not linear, or not straight, so that flexible connectors or connectors capable of accommodating angles between adjacent components are utilized to provide fluid flow between components. A flexible connector, or fitting, can include any of a hump hose, a metal bellows connector with a smooth interior, and a metal connector with a braided mesh exterior and a smooth interior. Additionally, the components themselves may be rotated or positioned in orientations other than vertically or horizontally with respect to the component's major surface or longest axis. An example of the rotation of an individual component is the rotation of the supercharger 537 so that the hood line of the light duty truck could remain unaltered, as well as the inclination of the cylinder assembly 314 to allow for the engine's overall height H to fit within the engine compartment. An example of component orientation and modification specific to the fitment of the air-handling system 530 into an opposed-piston engine as described hereinabove and into a light-duty truck is the aftertreatment assembly 580. The positioning of the DOC 581 and SCR 583 components of the aftertreatment assembly 580, as well as specialization of the inlet and outlet plenums of the aftertreatment assembly 580, as shown in FIGS. 5, 6A, and 6B, allows for positioning of the aftertreatment assembly 580 as close as possible to the outlet of the turbocharger turbine, in turn allowing for quick catalyst light-off while capturing as much thermal energy as possible.

Referring now to the figures, the opposed engine 100 secured in the engine compartment of a light duty truck includes a tilted inline cylinder assembly 314 (FIGS. 3A and 3B), and an air handling system 530 with a turbocharger 565 situated near an exhaust end of the cylinder assembly 314 (FIGS. 3A, 5, and 6A). The air handling system 530 includes an intake duct assembly comprising an inlet duct 531 and a compressor inlet conduit embodied as a turning bend duct 550 for transporting intake air to a compressor 566 of the turbocharger 565 (FIGS. 5, 6A, and 6B). The turning bend duct 550 turns an inward flow of intake air flowing in a first direction from the inlet duct 531 to an outward flow of intake air which is substantially opposite the first direction. That is to say, intake air flows into the turning bend duct 550 in a first direction from the front of the engine, through the inlet duct 531. The intake air travels through the body of the turning bend duct 550 towards the back of the engine and then is directed towards the front of the engine again, so the intake air that exits the turning bend duct 550 flows in a second direction, towards an inlet of the compressor 566. As the intake air exits the turning bend duct 550 to flow to the compressor 566, the second direction in which it is flowing is generally opposite the first direction (i.e., back to front versus front to back).

Engine design considerations may place the turning bend duct 550 in close proximity to the firewall 40 (FIG. 6B). In this regard, intake air must be brought to the inlet of the compressor 566 which is positioned rearwardly of the FEAD 513 (FIG. 5). The compressor inlet 566*i* (FIG. 6B) comprises an annular rim that faces the firewall 40. The intake duct assembly must deliver the intake air to the compressor inlet 566*i*. Intake air obtained at the front of the engine compartment flows rearwardly, in the direction of the firewall 40. The turning bend duct 550 is configured to reverse the intake airflow direction, for provision to the compressor inlet, in the narrow space between the compressor inlet and the firewall 40.

Figure 7A:
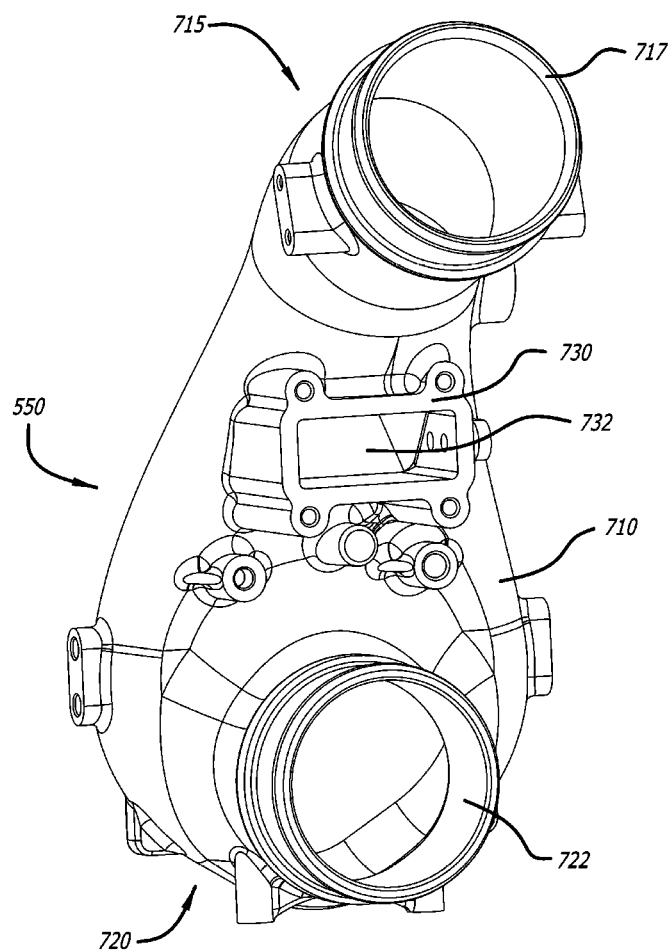
FIG. 7A is a perspective view of a turning bend duct in the air handling system shown in FIGS. 6A and 6B.

FIGS. 7A, 7B, and 7C show a preferred embodiment of the turning bend duct 550. Preferably, the turning bend duct 550 is a cobra-head duct with a first wall 710, a second wall 712 facing away from the first wall 710, and an air transport case 714 defined between the first wall 710 and the second wall 712. With the orientation of the engine shown in FIG. 6B, the second wall 712 faces the firewall 40, which defines the rear of the engine compartment; thus it may be termed "the back wall", in which case the first wall 710 is "the front wall". The air transport case has a first end 715 defining a substantially tubular inlet 717 that curves in a first direction, and a second end 720, opposite the first end, with an outlet 722 comprising an annular rim formed in the first wall 710, facing the first direction. As per FIG. 7A and FIG. 7C, the air transport case 714 has a shape that widens in the direction of the second end 720. The shape resembles that of a pear. The second wall 712 of the air transport case 714 has a flat wall section 725 that extends to the second end 720. As shown in FIG. 6B, the flat wall section 725 allows the turning bend duct 550 to avoid intrusion into the firewall 40, while enabling redirection of intake air to the compressor inlet 566*i*.

The shape of the turning bend duct 550 allows for continuity in air flow mass and/or volume from the air inlet conduit (401 in FIG. 4), into the inlet 717, through the air transport case 714, and out the outlet 722. The flattened portion of the air transport case has a varying cross-section configuration that gradually transitions in width so that air flowing through the turning bend duct 550 does not experience resistance or a drop in volume when comparing air flow through the tubular inlet 717 and through the flattened portion of the turning bend duct 550.

As seen in FIGS. 7A-7C the turning bend duct 550 includes a flange 730 formed in the front wall 710 of the air transport case 714 between the tubular inlet 717 and the annular outlet 722. The flange defines an aperture 732 through which exhaust gas flows into the air transport case 714 from an EGR loop. As best seen in FIG. 5, the flange 730 provides an attachment location where the outlet of the LP EGR cooler 560 may be secured in communication with the aperture 732, affording a coupling of the LP EGR loop (560, 561, 570) of FIG. 5 with the intake duct assembly (531, 550). In this regard, the flange corresponds to the node 402 of the air handling system illustrated in FIG. 4.

Although principles of engine placement have been described with reference to presently preferred embodiments, it should be understood that various modifications can be made without departing from the spirit of the described principles. Accordingly, any patent protection accorded to these principles is limited only by the following claims.

What is claimed is:

1. A vehicle, comprising:
a chassis with spaced-apart frame rails running in a longitudinal direction of the chassis, between front and rear ends of the truck;
an engine compartment comprising and bounded by a hood, a firewall, and at least one cowl panel;
an opposed-piston engine supported on the frame rails and fitted in the engine compartment;
the opposed-piston engine comprising:
a cylinder assembly with a longitudinal axis that is offset from a vertical plane of the engine by an angle;
two crankshafts positioned at respective exhaust and intake ends of the cylinder assembly; and
an air handling system that comprises an EGR loop.

2. The vehicle of claim 1, in which the vehicle either is a light-duty truck or has a maximum gross vehicle weight rating of 8,500 pounds.

3. The vehicle of claim 1, in which the air handling system comprises an intake duct assembly configured for delivering air to a compressor of the air handling system, a portion of the intake duct assembly being located near the firewall.

4. The vehicle of claim 3, in which the intake duct assembly comprises a compressor inlet conduit that includes a tubular portion with a circular cross-section and flattened portion, the flattened portion including an opening configured to receive a flexible fitting to connect the opening on the flattened portion to an inlet of the compressor.

5. The vehicle of claim 4, in which the flattened portion of the compressor inlet conduit has a varying cross-section that transitions in width so that air flowing through the compressor inlet conduit does not experience resistance or a drop in volume when comparing air flow through the tubular portion and through the flattened portion.

6. The vehicle of claim 4, in which the air handling system includes an aftertreatment system comprising at least one catalyst component.

7. The vehicle of claim 1, in which the EGR loop comprises at least one of a high-pressure exhaust gas recirculation loop and a low-pressure exhaust gas recirculation loop.

8. The vehicle of claim 1, further comprising:
a transmission located rearwardly of the engine compartment;
a cargo bed; and
a passenger compartment located above the transmission, behind the engine compartment, and forward of the cargo bed.

9. The vehicle of claim 8, in which the transmission attaches to the opposed-piston engine through the crankshaft at the exhaust end of the cylinder assembly.

10. The vehicle of claim 1, wherein the angle of offset between the longitudinal axis of the cylinder assembly and the longitudinal axis of the engine is in the range from about 5 degrees to about 45 degrees.

11. The vehicle of claim 10, in which the opposed-piston engine is a compression ignition engine.

12. The vehicle of claim 1, in which the air handling system includes at least one flexible connector between conduit and/or component openings, the at least one flexible connector comprising any of a hump hose, a metal bellows connector with a smooth interior, and a metal connector with a braided mesh exterior and a smooth interior.

13. A truck, comprising:
a chassis;
an engine compartment defined by a front end of the truck, a firewall, a cowl panel; and a hood; and,
an opposed-piston engine supported on the chassis and fitted in the engine compartment;
the opposed-piston engine comprising:
a tilted inline cylinder assembly; and,
an air handling system with a turbocharger situated near an exhaust end of the cylinder assembly, and an intake duct assembly for transporting intake air to a compressor of the turbocharger;
the intake duct assembly having a turning bend duct adjacent the firewall for turning an inward flow of intake air in a first direction to an outward flow of intake air which is substantially opposite the first direction.

14. The truck of claim 13 in which the turning bend duct comprises a cobra-head portion with a front wall facing the front end of the truck, a back wall facing the firewall, and an air transport case defined between the front wall and the back wall, the air transport case having a first end defining a substantially tubular inlet that curves toward the front end, and a second end with an outlet comprising an annular rim formed in the front wall, facing the front end; in which the case has a shape in plan that widens in the direction of the second end; and, in which the back wall of the case has a flat wall section that faces the firewall.

15. The truck of claim 14 in which the air handling system further comprises an exhaust gas recirculation (EGR) loop for transporting exhaust gas to the intake duct assembly, and the case has a flange formed in the front wall between the annular inlet and the annular outlet for attachment to the EGR loop, the flange defining an aperture through which the exhaust gas flows into the case.

16. The truck of claim 15 in which the EGR loop is a low pressure EGR loop, and the flange is coupled to an outlet of the low pressure EGR loop.

17. The truck of claim 16 in which the outlet of the low pressure EGR loop comprises an outlet of an EGR cooler.

18. The truck of claim 14 in which the cylinder assembly is tilted to locate the exhaust end of the cylinder assembly between a driver's side of the truck and a passenger's side of the truck, in the vicinity of a front axle of the truck.

19. The truck of claim 14, in which the air handling system further comprises a supercharger situated near an intake end of the cylinder assembly opposite the exhaust end and a charge air transport channel coupling an output of a compressor of the turbocharger with an inlet of the supercharger.

20. The truck of claim 19 in which the charge air transport channel comprises an intercooler between the output of the compressor and the inlet of the supercharger.

21. The truck of claim 19 in which the cylinder assembly is tilted to locate the exhaust end of the cylinder assembly between a driver's side of the truck and a passenger's side of the truck.

22. The truck of claim 19 in which the cylinder assembly is tilted to locate the intake end on a driver's side of the truck, in the vicinity of the hood, and to locate the exhaust end between the driver's side of the truck and a passenger's side of the truck.

23. A turning bend intake duct for a vehicle, comprising:
a cobra-head duct portion with a first wall, a second wall facing away from the first wall, and an air transport case defined between the first wall and the second wall;
the air transport case having a first end defining a substantially tubular inlet that curves in a first direction, and a second end, opposite the first end, with an outlet comprising an annular rim formed in the front wall, facing the first direction;
in which the case has a shape in a front elevation view that widens in the direction of the outlet; and,
in which the back wall of the case has a flat wall section.

24. The turning bend duct of claim 23, in which the shape in a front elevation view is substantially the shape of a pear.

25. A truck, comprising:
a chassis with spaced-apart frame rails running in a longitudinal direction of the chassis, between front and rear ends of the truck;
an engine compartment comprising and bounded by a hood, a firewall, and at least one cowl panel;
an opposed-piston engine supported on the frame rails and fitted in the engine compartment;
the opposed-piston engine comprising:
an engine block with a cylinder assembly comprising two or more cylinders in an in-line configuration, the cylinder assembly having an intake side where intake ports of each cylinder are located and an exhaust side where exhaust ports of each cylinder are located, the cylinder assembly tilted to locate the intake side on a first side of the truck, in the vicinity of the hood;
two crankshafts positioned at respective exhaust and intake ends of the cylinder assembly; and
an air handling system that comprises both a high-pressure exhaust gas recirculation (EGR) loop and a low-pressure EGR loop located on a second side of the truck.

26. The truck of claim 25, wherein the first side of the truck is a driver's side and the second side of the truck is a passenger's side.

27. The truck of claim 25, wherein the first side of the truck is a passenger's side and the second side of the truck is a driver's side.

28. The truck of claim 25, wherein the opposed-piston engine is a combustion ignition engine.

29. The truck of claim 25, wherein the engine block further comprises an intake plenum and an exhaust plenum, the intake plenum and the exhaust plenum each having a single fitting to the air handling system.

\* \* \* \* \*